United States Patent
Chen

(10) Patent No.: US 11,183,039 B2
(45) Date of Patent: Nov. 23, 2021

(54) TWO-LEVEL LED SECURITY LIGHT WITH MOTION SENSOR

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

(21) Appl. No.: 17/202,879

(22) Filed: Mar. 16, 2021

(65) Prior Publication Data

US 2021/0298155 A1 Sep. 23, 2021

Related U.S. Application Data

(63) Continuation of application No. 16/159,852, filed on Oct. 15, 2018, now Pat. No. 10,985,596, which is a (Continued)

(51) Int. Cl.
*H05B 47/11* (2020.01)
*G08B 15/00* (2006.01)
(Continued)

(52) U.S. Cl.
CPC ............ *G08B 15/00* (2013.01); *F21S 9/03* (2013.01); *F21V 17/02* (2013.01); *G08B 5/36* (2013.01); *G08B 13/1895* (2013.01); *G08B 15/002* (2013.01); *H02J 7/35* (2013.01); *H05B 39/042* (2013.01); *H05B 39/044* (2013.01); *H05B 45/10* (2020.01); *H05B 45/12* (2020.01); *H05B 45/14* (2020.01); *H05B 45/20* (2020.01); *H05B 45/37* (2020.01); *H05B 45/44* (2020.01); *H05B 45/46* (2020.01); *H05B 45/48* (2020.01);
(Continued)

(58) Field of Classification Search
CPC ........ H05B 45/10; H05B 45/20; H05B 45/32; H05B 47/11; H05B 47/16; H05B 47/19; H05B 47/105; H05B 47/115
See application file for complete search history.

(56) References Cited

U.S. PATENT DOCUMENTS 5,134,387 A 7/1992 Smith et al.
5,598,066 A 1/1997 Wiesemann et al.
(Continued)

*Primary Examiner* — Tung X Le
(74) *Attorney, Agent, or Firm* — Rosenberg, Klein & Lee

(57) ABSTRACT

An LED security light includes an LED load and a motion sensor. The LED load is activated at dusk and deactivated at dawn by a light sensing control unit. At night, the LED load is activated for performing a low level illumination. When a motion signal is detected by the motion sensor, the LED load is switched to perform a high level illumination for a short time period and then resumes to the low level illumination. The low level illumination and the high level illumination are respectively adjustable within respective designed ranges. The LED load is driven by a switching circuitry comprising a driver to output an adequate voltage with constant electric current such that a voltage V across each LED is confined in a range $V_{th}<V<V_{max}$ with $V_{th}$ being a threshold voltage and $V_{max}$ being a maximum voltage avoiding damaging the LED.

36 Claims, 16 Drawing Sheets

Related U.S. Application Data continuation of application No. 15/393,768, filed on Dec. 29, 2016, now Pat. No. 10,136,495, which is a continuation of application No. 15/213,595, filed on Jul. 19, 2016, now Pat. No. 9,622,328, which is a continuation of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.

| | | |
|---|---|---|
| *H05B 45/14* | (2020.01) | |
| *H05B 45/20* | (2020.01) | |
| *H05B 45/44* | (2020.01) | |
| *H05B 45/46* | (2020.01) | |
| *H05B 45/48* | (2020.01) | |
| *H05B 47/16* | (2020.01) | |
| *H05B 47/115* | (2020.01) | |
| *H05B 47/17* | (2020.01) | |
| *H05B 45/12* | (2020.01) | |
| *H05B 45/37* | (2020.01) | |
| *H05B 47/10* | (2020.01) | |
| *H05B 45/10* | (2020.01) | |
| *H05B 47/105* | (2020.01) | |
| *H05B 39/04* | (2006.01) | |
| *F21S 9/03* | (2006.01) | |
| *F21V 17/02* | (2006.01) | |
| *G08B 5/36* | (2006.01) | |
| *G08B 13/189* | (2006.01) | |
| *H02J 7/35* | (2006.01) | |
| *F21Y 115/10* | (2016.01) | |
| *G08B 13/00* | (2006.01) | |

(52) U.S. Cl.
CPC ........... *H05B 47/10* (2020.01); *H05B 47/105* (2020.01); *H05B 47/11* (2020.01); *H05B 47/115* (2020.01); *H05B 47/16* (2020.01); *H05B 47/17* (2020.01); *F21Y 2115/10* (2016.08); *G08B 13/00* (2013.01); *G08B 13/189* (2013.01); *Y02B 20/40* (2013.01)

(56) References Cited

U.S. PATENT DOCUMENTS

| | | |
|---|---|---|
| 5,747,937 A | 5/1998 | Wiesemann et al. |
| 6,016,038 A | 1/2000 | Mueller et al. |
| 6,211,626 B1 | 4/2001 | Lys et al. |
| 6,225,748 B1 | 5/2001 | Evans et al. |
| 6,548,967 B1 | 4/2003 | Dowling et al. |
| 6,888,323 B1 | 5/2005 | Null et al. |
| 6,909,239 B2 | 6/2005 | Gauna |
| 6,927,541 B2 | 8/2005 | Lee |
| 7,086,756 B2 | 8/2006 | Maxik |
| 7,088,059 B2 | 8/2006 | Mckinney et al. |
| 7,122,976 B1 | 10/2006 | Null et al. |
| 7,268,497 B2 | 9/2007 | Hsieh |
| 7,344,275 B2 | 3/2008 | Allen et al. |
| 7,405,524 B2 | 7/2008 | Null et al. |
| 7,564,198 B2 | 7/2009 | Yamamoto et al. |
| 7,804,252 B2 | 9/2010 | Chen |
| 8,159,125 B2 | 4/2012 | Miao |
| 8,194,061 B2 | 6/2012 | Wang et al. |
| 8,310,163 B2 | 11/2012 | Chen |
| 8,476,836 B2 | 7/2013 | Van De Ven et al. |
| 8,598,805 B2 | 12/2013 | Tremblay et al. |
| 9,271,345 B2 | 2/2016 | Welten |
| 9,338,860 B2 * | 5/2016 | Radermacher ....... H05B 47/175 |
| 2005/0007025 A1 | 1/2005 | Gauna |
| 2005/0259416 A1 | 11/2005 | Gauna et al. |
| 2006/0022916 A1 | 2/2006 | Aiello |
| 2007/0182338 A1 | 8/2007 | Shteynberg et al. |
| 2008/0079568 A1 * | 4/2008 | Primous ................. H05B 47/11 340/541 |
| 2008/0197783 A1 | 8/2008 | Chen |
| 2008/0252197 A1 | 10/2008 | Li et al. |
| 2010/0117543 A1 | 5/2010 | Van Der Veen et al. |
| 2010/0207532 A1 * | 8/2010 | Mans .................... H05B 47/17 315/158 |
| 2011/0285292 A1 | 11/2011 | Mollnow et al. |
| 2012/0049760 A1 | 3/2012 | Dennis et al. |

\* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS®E/DURISR E 2835 | www.osram.com/app/product_selector/#!?query=DORIS%20E%202835&sortField=&sortOrder=&start-0&filters=productbrand,DORIS,E&filters-productbrand,DORIS,productbrand,DORIS |

FIG. 9

TWO-LEVEL LED SECURITY LIGHT WITH MOTION SENSOR

CROSS-REFERENCE TO RELATED APPLICATIONS

This is a continuation application of prior application Ser. No. 16/159,852, filed on Oct. 15, 2018. Application Ser. No. 16/159,852 is a continuation application of prior application Ser. No. 15/393,768, filed on Dec. 29, 2016, which issued as U.S. Pat. No. 10,136,495 on Nov. 20, 2018. Application Ser. No. 15/393,768 is a continuation application of prior application Ser. No. 15/213,595, filed on Jul. 19, 2016, which issued as U.S. Pat. No. 9,622,328 on Apr. 11, 2017. Application Ser. No. 15/213,595 is a continuation application of prior application Ser. No. 14/478,150, filed on Sep. 5, 2014, which issued as U.S. Pat. No. 9,445,474 on Sep. 13, 2016. Application Ser. No. 14/478,150 is a continuation application of prior application Ser. No. 13/222,090, filed on Aug. 31, 2011, which issued as U.S. Pat. No. 8,866,392 on Oct. 21, 2014.

BACKGROUND

1. Technical Field

The present disclosure relates to a lighting apparatus, in particular, to a two-level security LED light with motion sensor

2. Description of Related Art

Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that the ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that the ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes a phase controller and one or a plurality of parallel-connected alternating current (AC) LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto turn off at dawn. The PC mode may generate a high level illumination for a predetermined duration then automatically switch to the PS mode by a control unit to generate a low level illumination. When the motion sensor detects a human motion, the disclosed LED security light may immediate switch to the high level illumination for a short predetermined duration thereby achieve illumination or warning effect. After the short predetermined duration, the LED security light may automatically return to the low level illumination for saving energy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of the minimum forward voltages and maximum forward voltages collected from various LED manufacturers.

DESCRIPTION OF THE EXEMPLARY EMBODIMENTS

Figure 1:
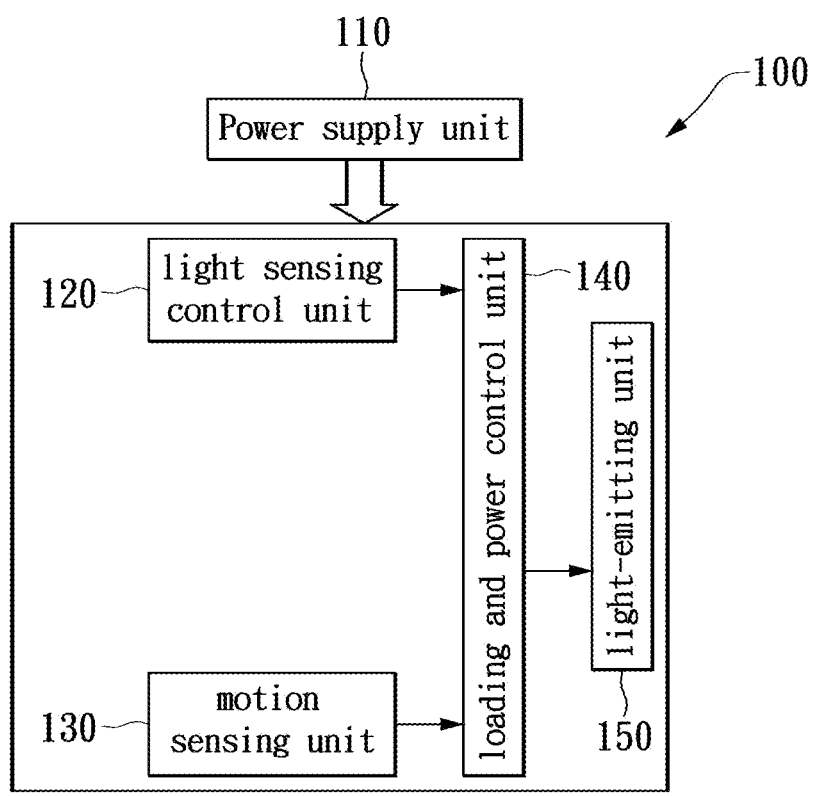
FIG. 1 schematically illustrates a block diagram of a two-level LED security light in accordance with an exemplary embodiment of the present disclosure.
Figure 1A:
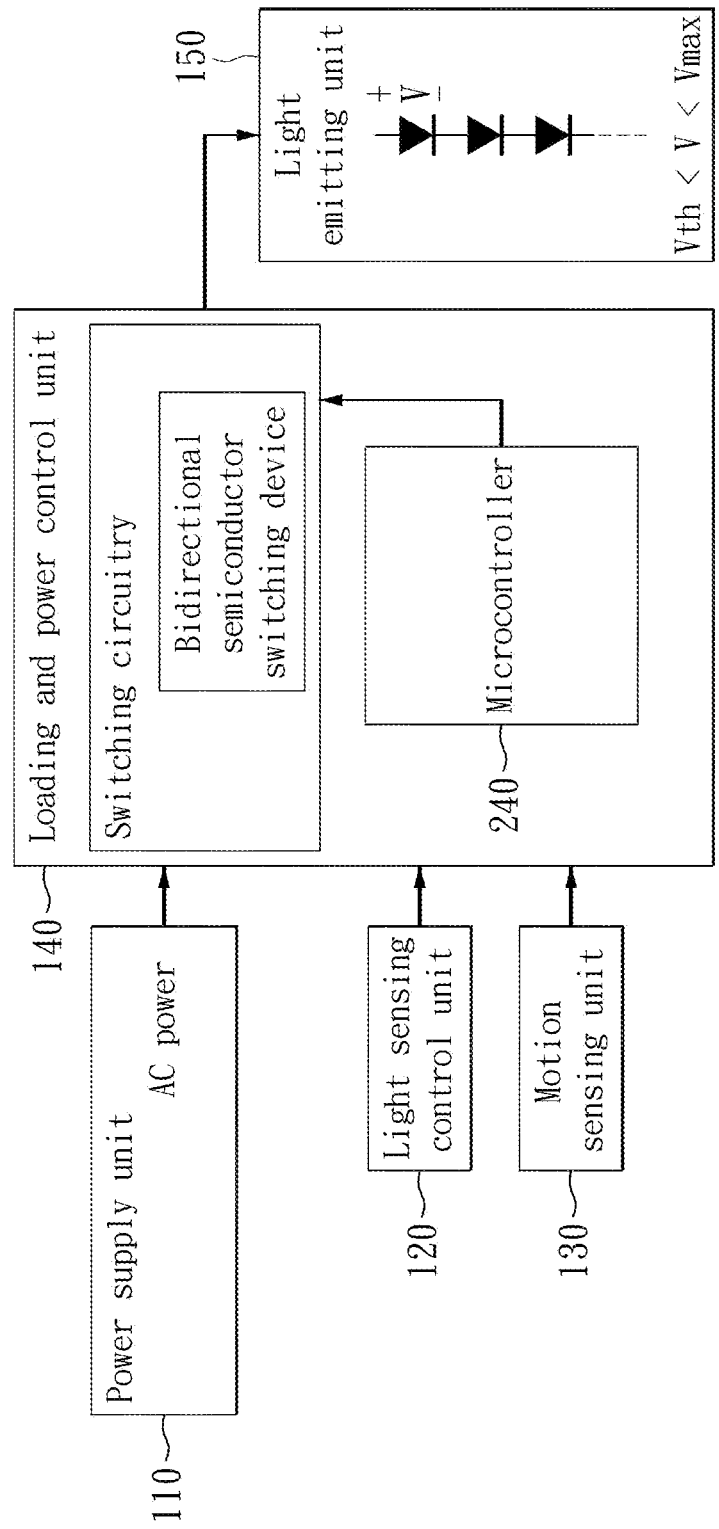
FIG. 1A is an enhanced block diagrammed under FIG. 1 to specifically illustrate an embodiment of FIG. 1 for an ACLED two-level security light, wherein the loading and power control unit comprises a switching circuitry and a microcontroller, wherein the switching circuitry further comprises a bidirectional semiconductor switching device for controlling an average electric power to be delivered to the ACLED.
Figure 1B:
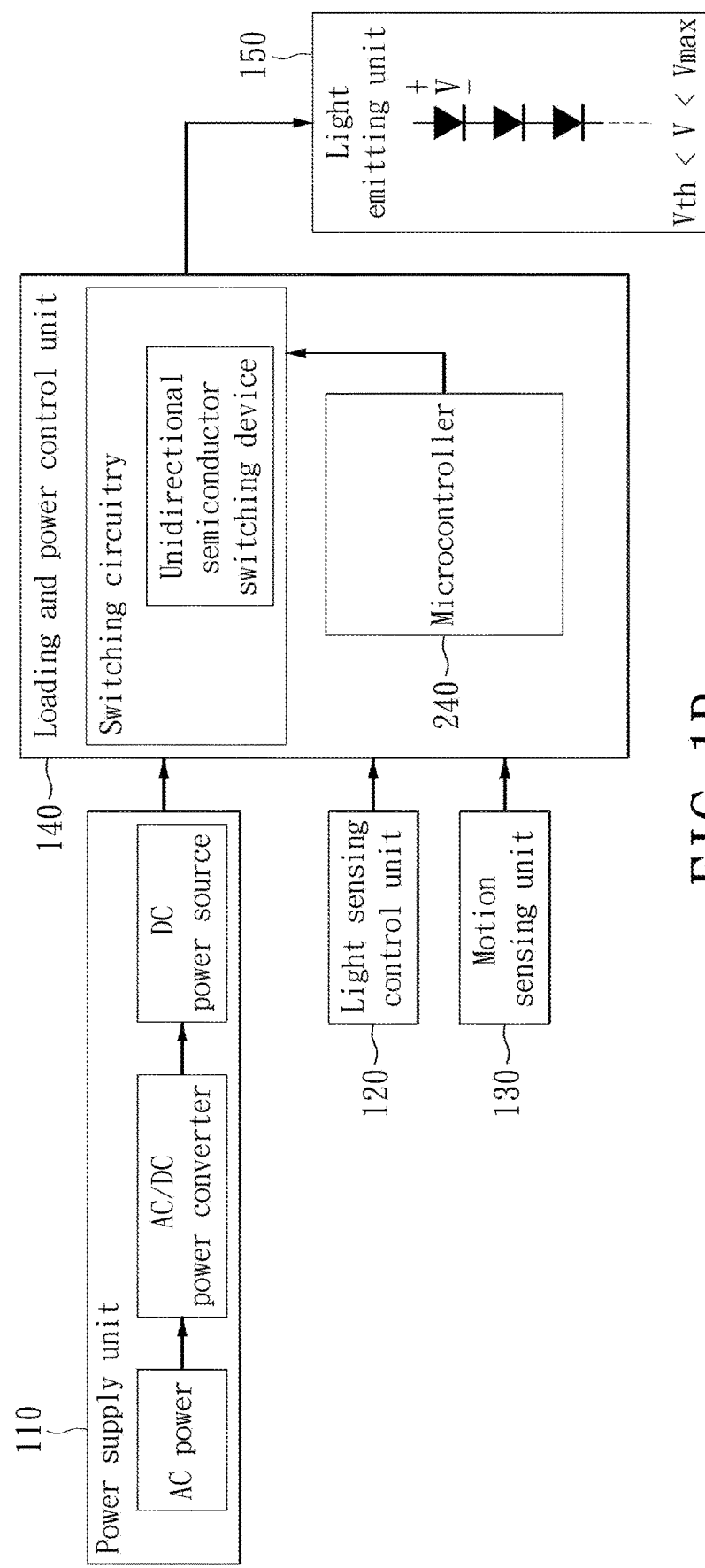
FIG. 1B is an enhanced block diagrammed under FIG. 1 to specifically illustrate an embodiment of FIG. 1 for a DC LED two-level security light, wherein the loading and power control unit comprises a switching circuitry and a microcontroller, wherein the switching circuitry further comprises an unidirectional semiconductor switching device for controlling an average electric power to be delivered to the DC LED.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs and switching components. The loading and power control unit 140 may control the light-emitting unit 150 to generate at least two levels of illumination variations.

When the light sensing control unit 120 detects that the ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flow through the light-emitting unit 150, to generate the high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto.

Figure 2A:
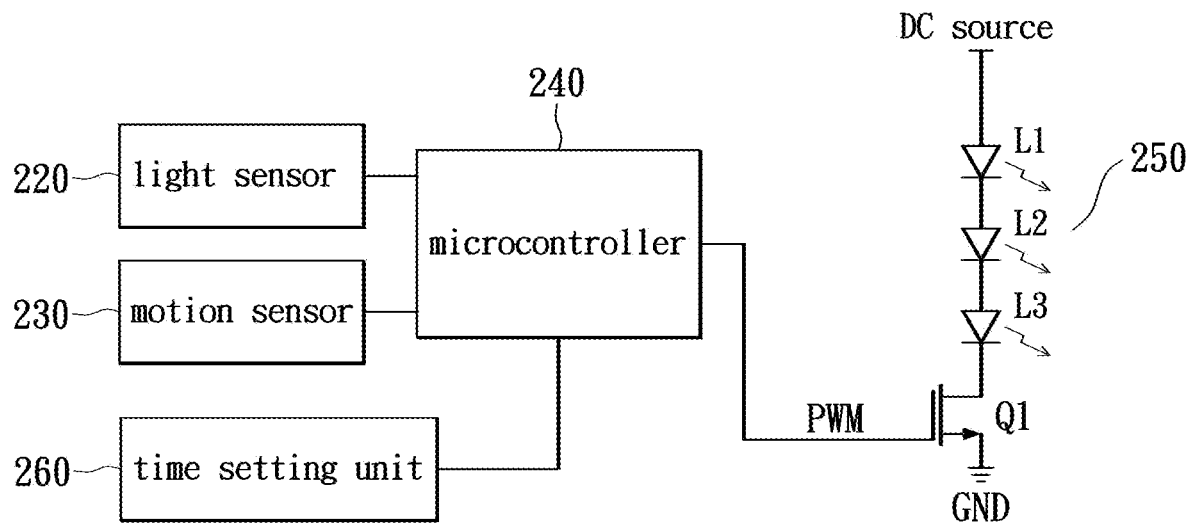
FIG. 2A illustrates a schematic diagram of a two-level LED security light in accordance to the first exemplary embodiment of the present disclosure.
Figure 2B:
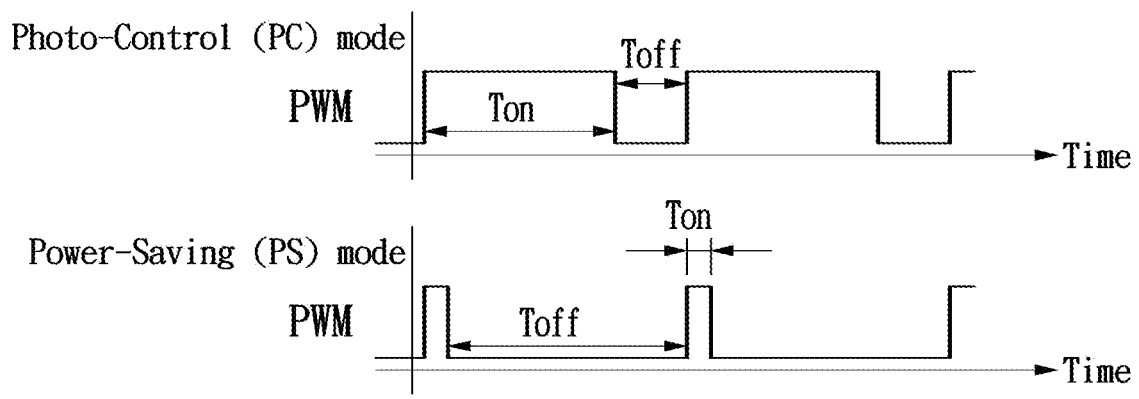
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow the user to configure the predetermined duration associated with the high level illumination in the PC mode, however the present disclosure is not limited thereto.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
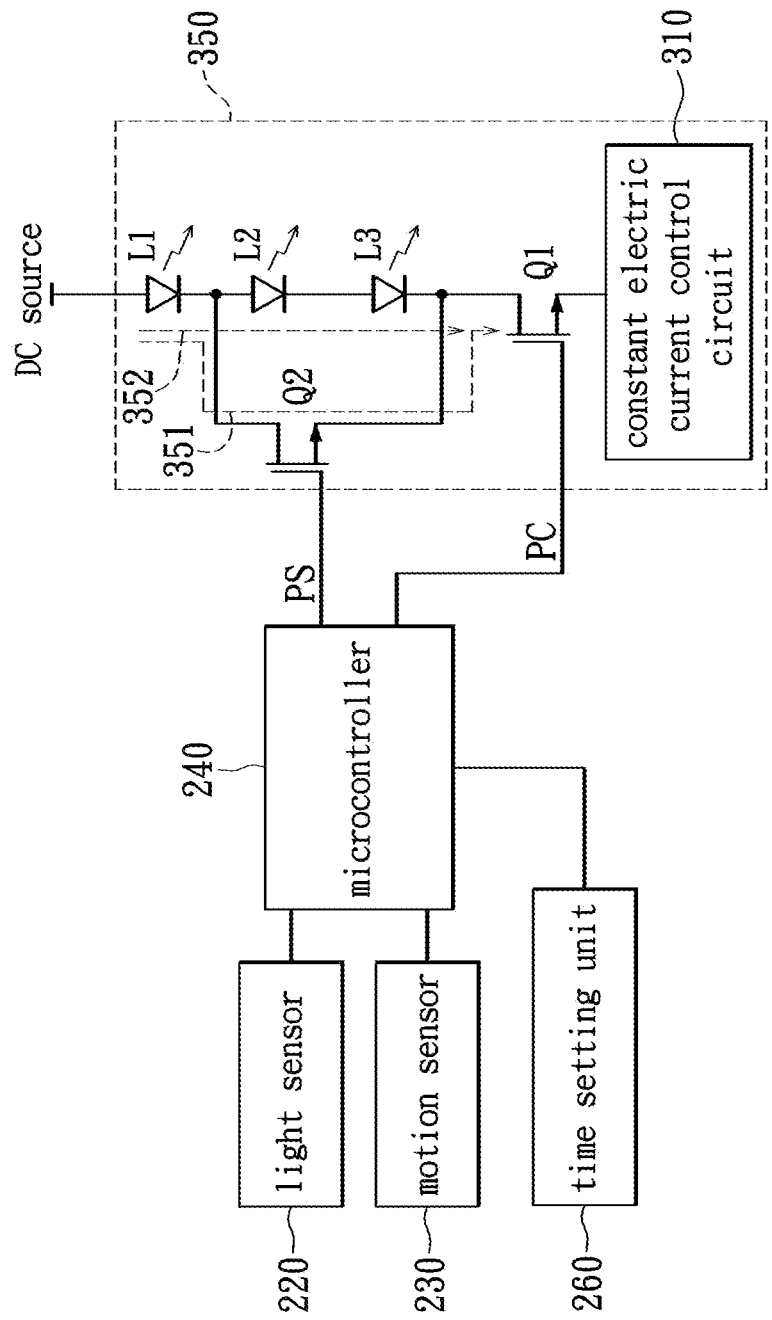
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
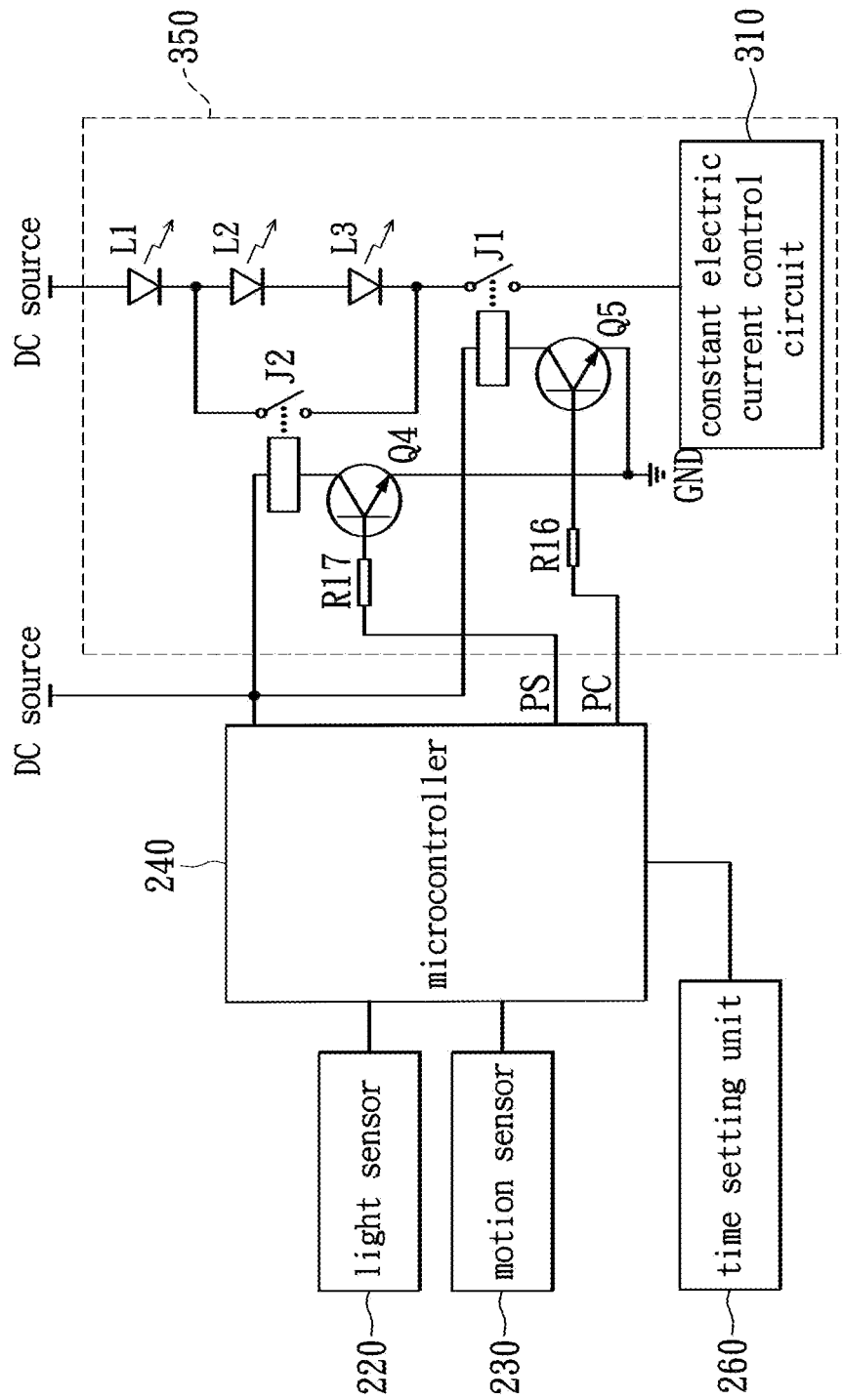
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700K while the LEDs L2 and L3 may adopt LEDs having color temperature of 5000K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
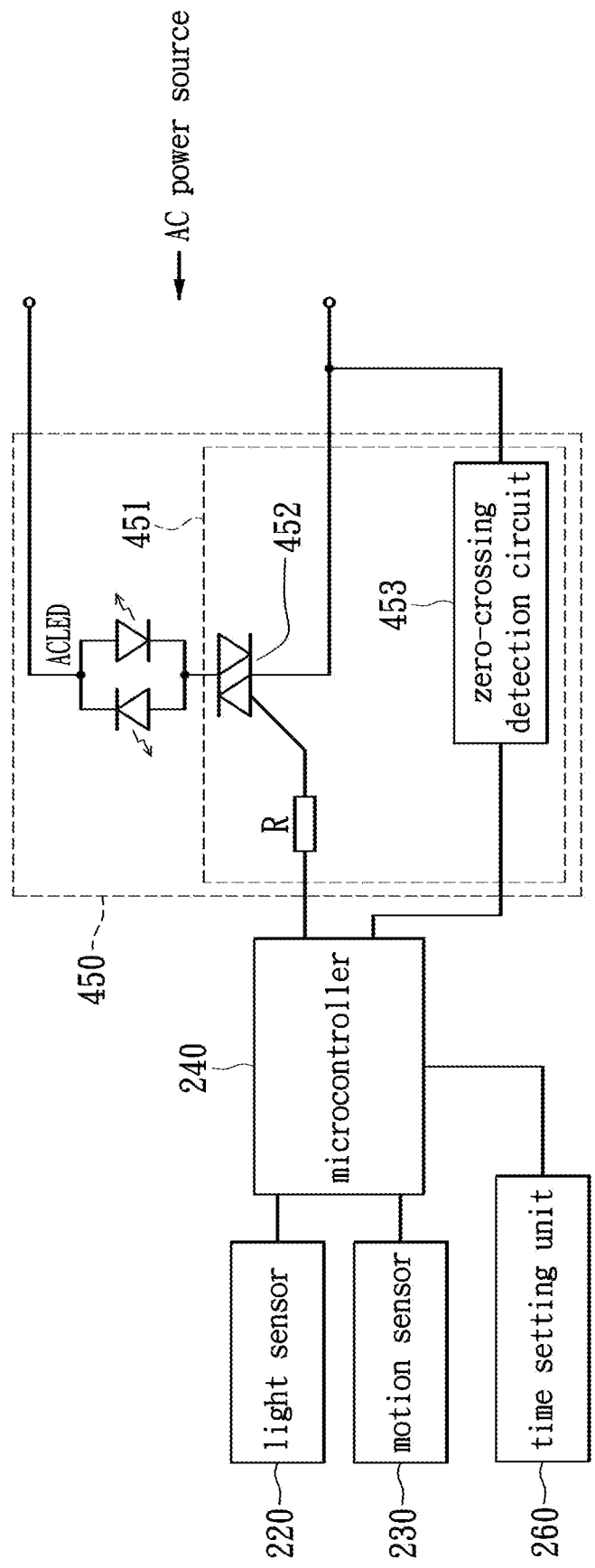
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 includes a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger the triac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (\frac{1}{2\pi f})\sin^{-1}(V_t/V_m)$. The described criterion is applicable to all types of ACLEDs to assure that the triac 452 can be stably triggered in both positive and negative half cycle of the AC power source. Take ACLED with $V_t$ (rms)=80V as an example, and supposing the $V_m$(rms)=110V and f=60 Hz, then $t_o$=2.2 ms and (½f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
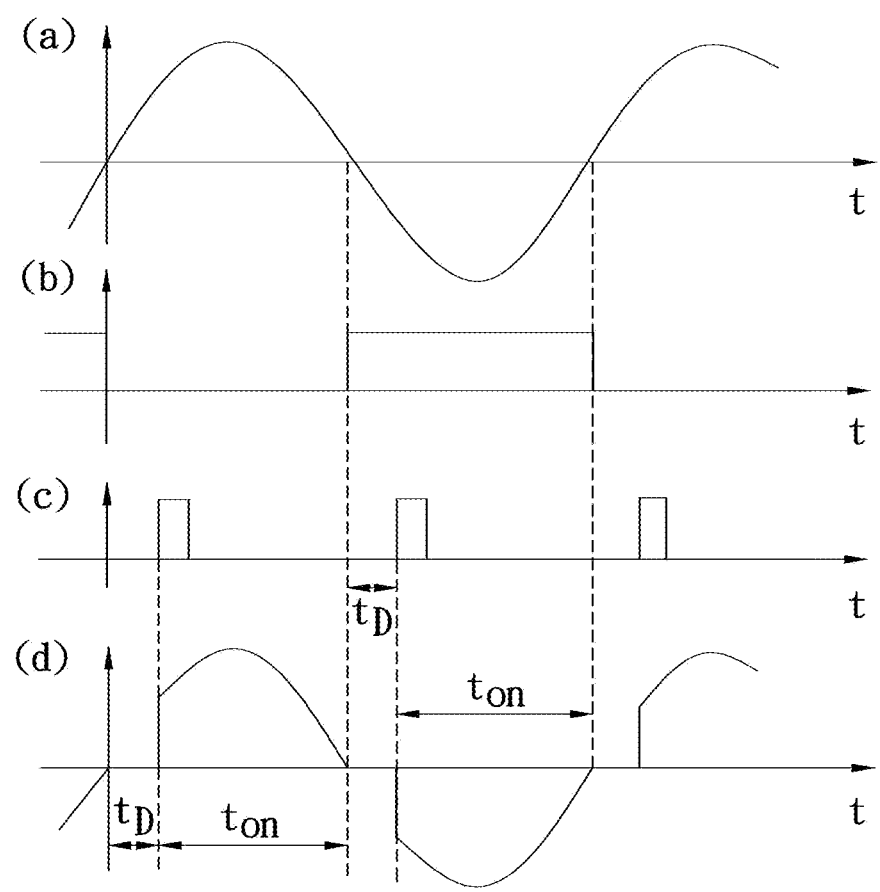
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
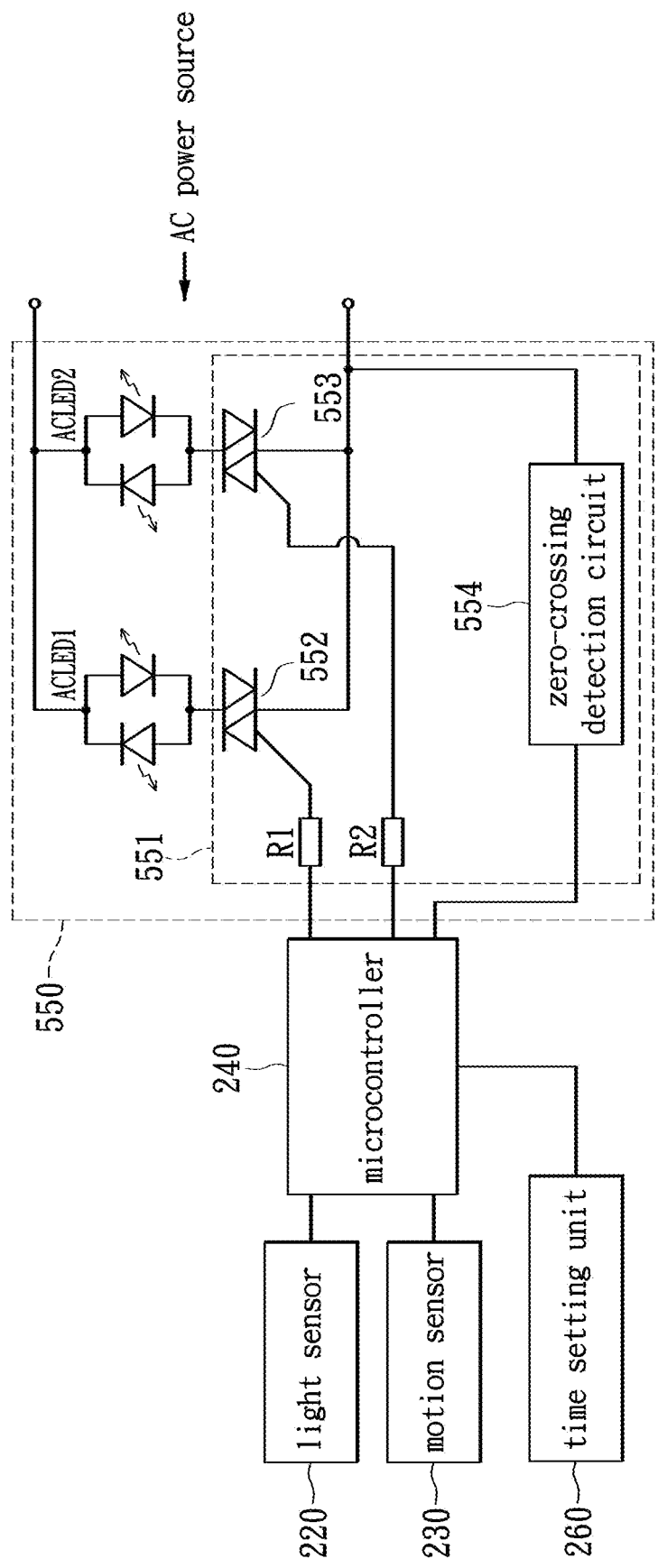
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
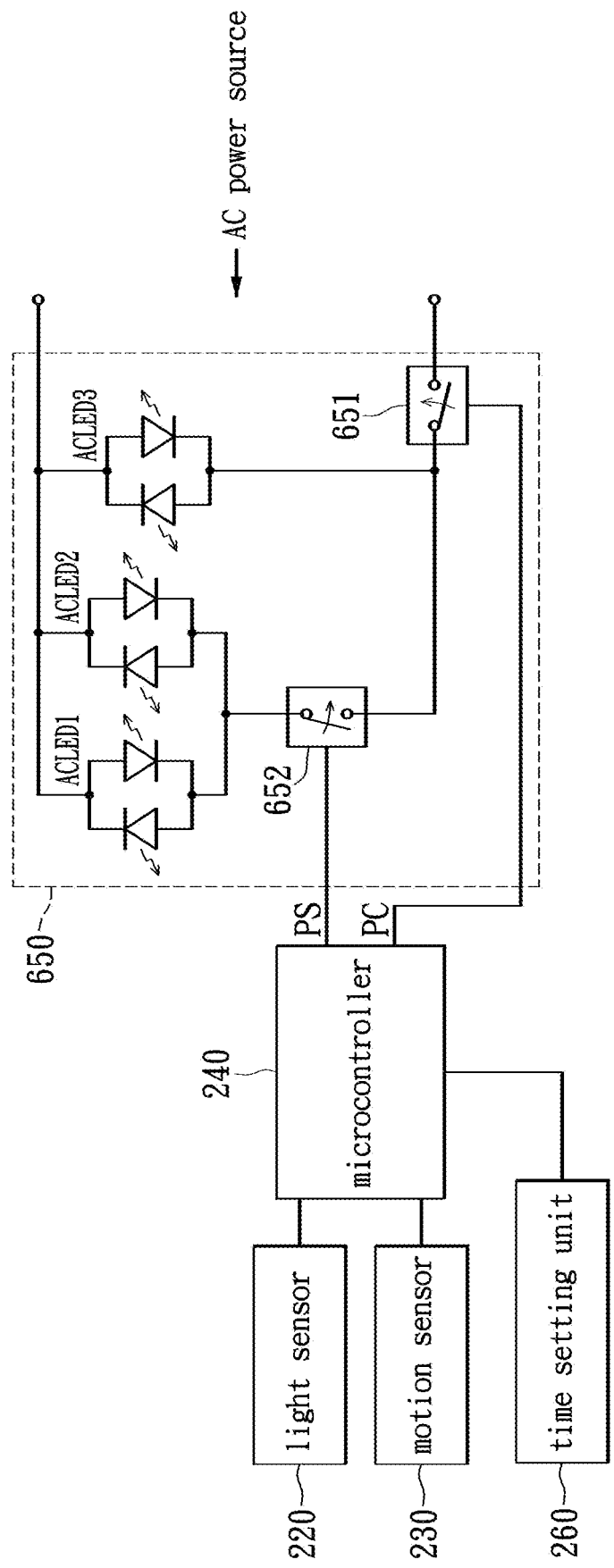
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having color temperature of 5000K. The ACLED3 may be a low power lighting source having color temperature of 2700K. Consequently, the ACLED may generate two levels of illuminations with high illumination and hue contrast without using a zero-crossing detection circuit.

Fifth Exemplary Embodiment

Figure 7:
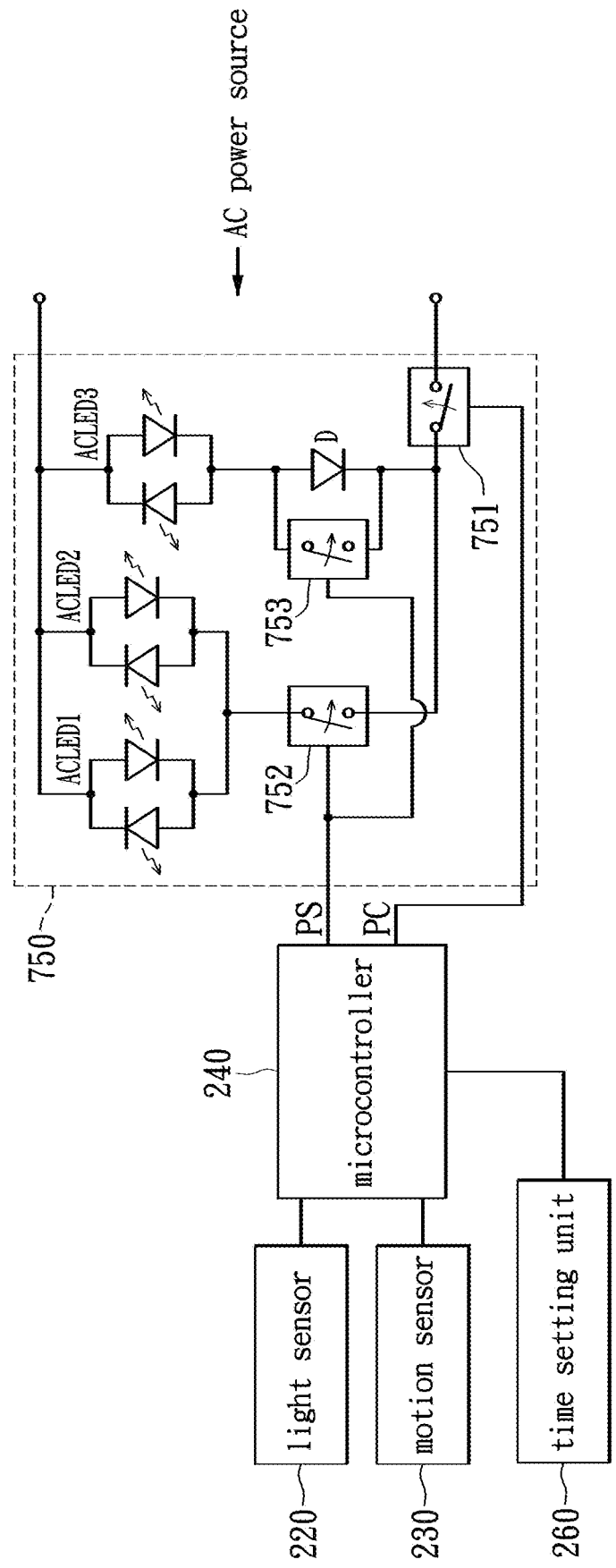
FIG. 7 illustrates a schematic diagram of a two-level LED security light in accordance to the fifth exemplary embodiment of the present disclosure.
Figure 8A:
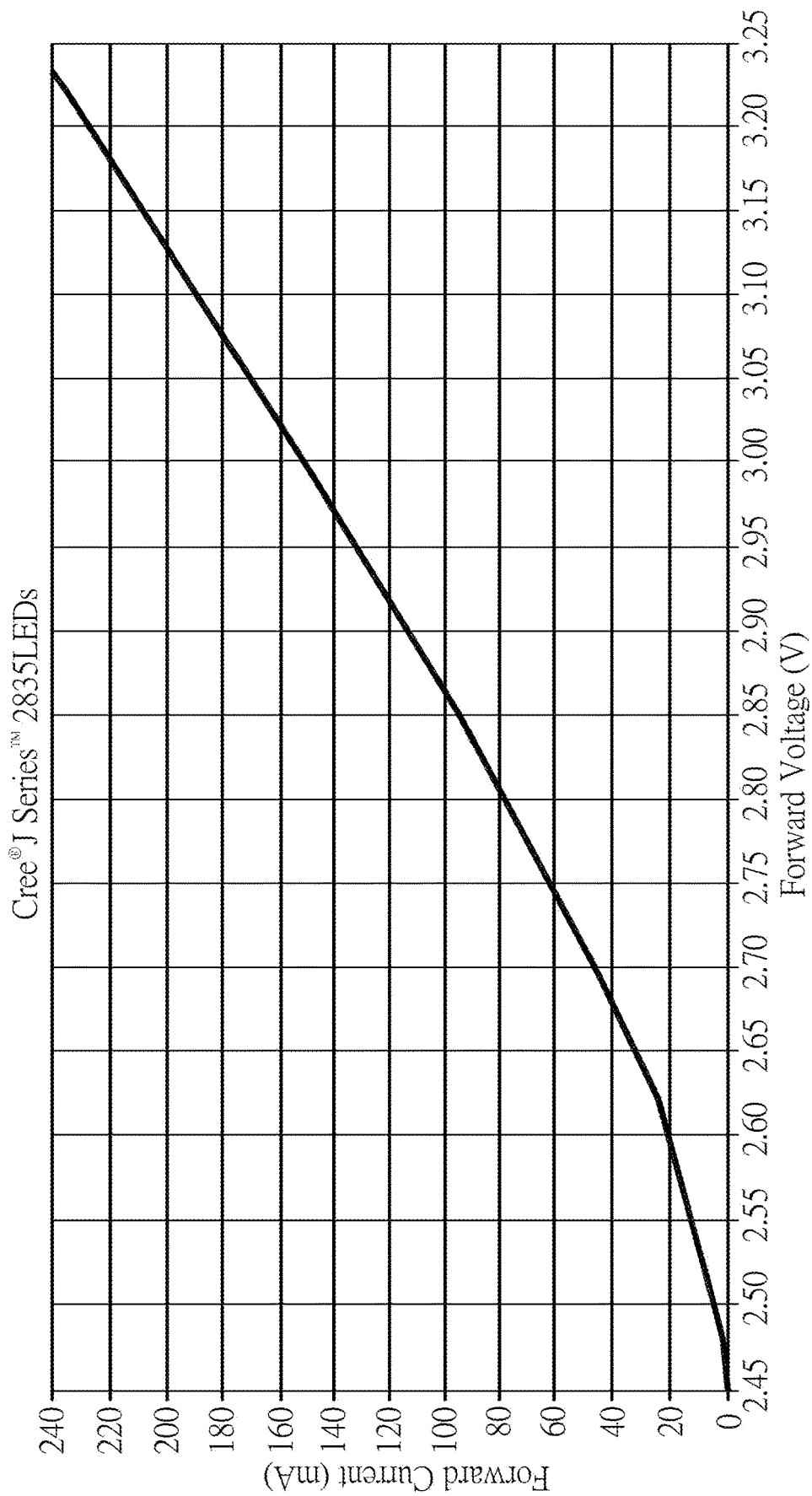
FIGS. 8A, 8B, 8C and 8D schematically and respectively show V-I relationship charts (Forward Current vs. Forward Voltage) for a white LED chip from each of 4 different LED manufacturers.
Figure 8B:
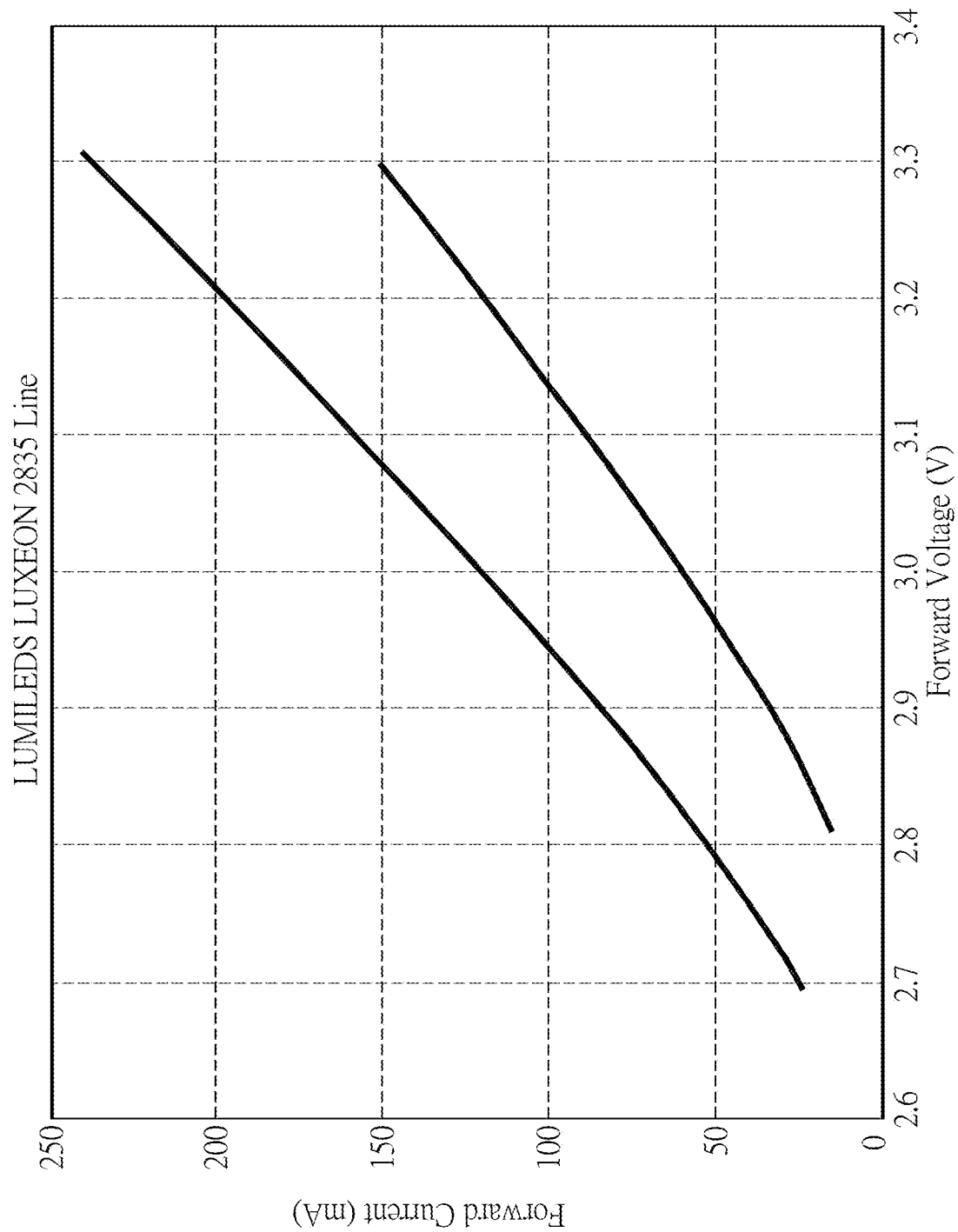
Figure 8C:
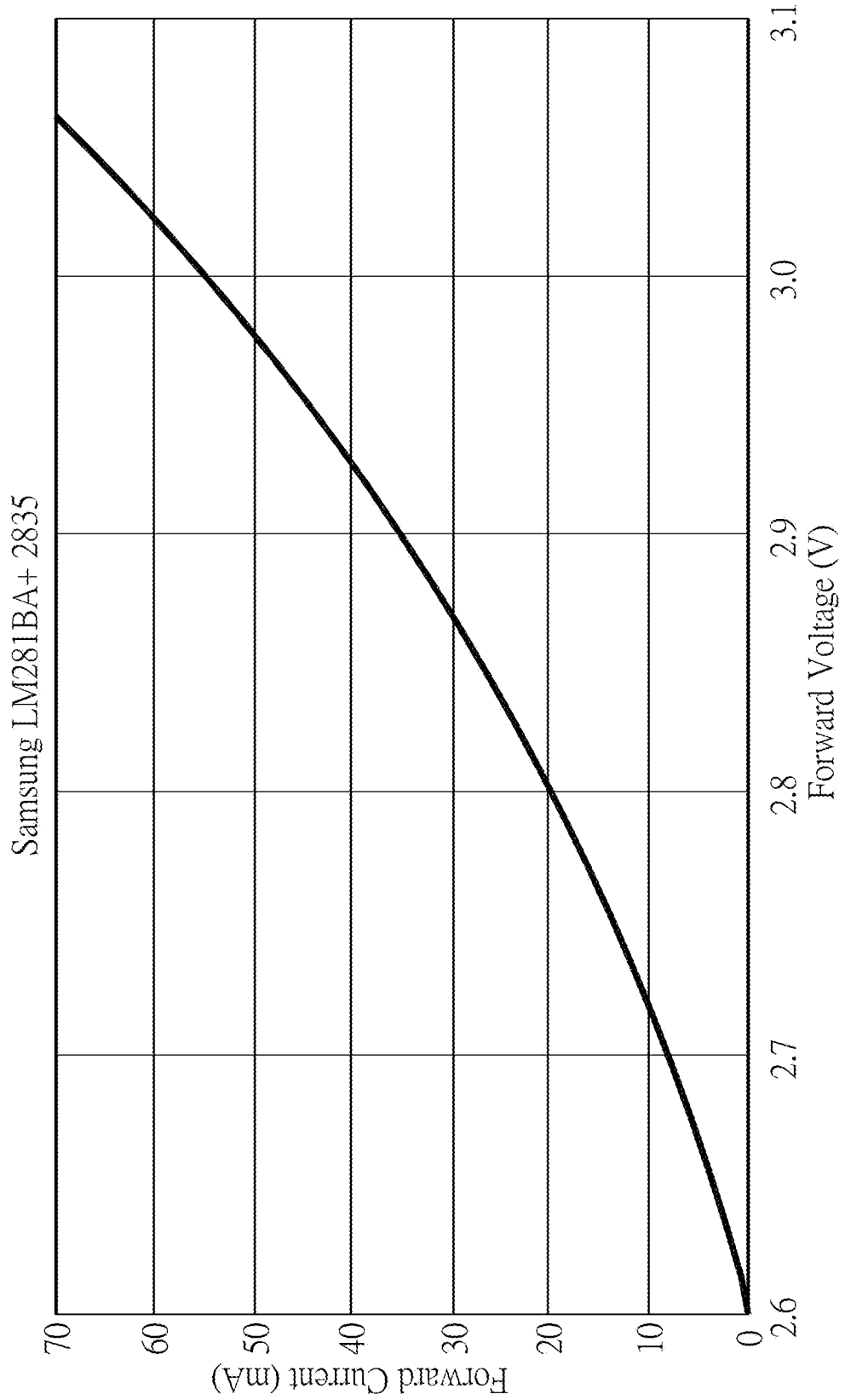
Figure 8D:
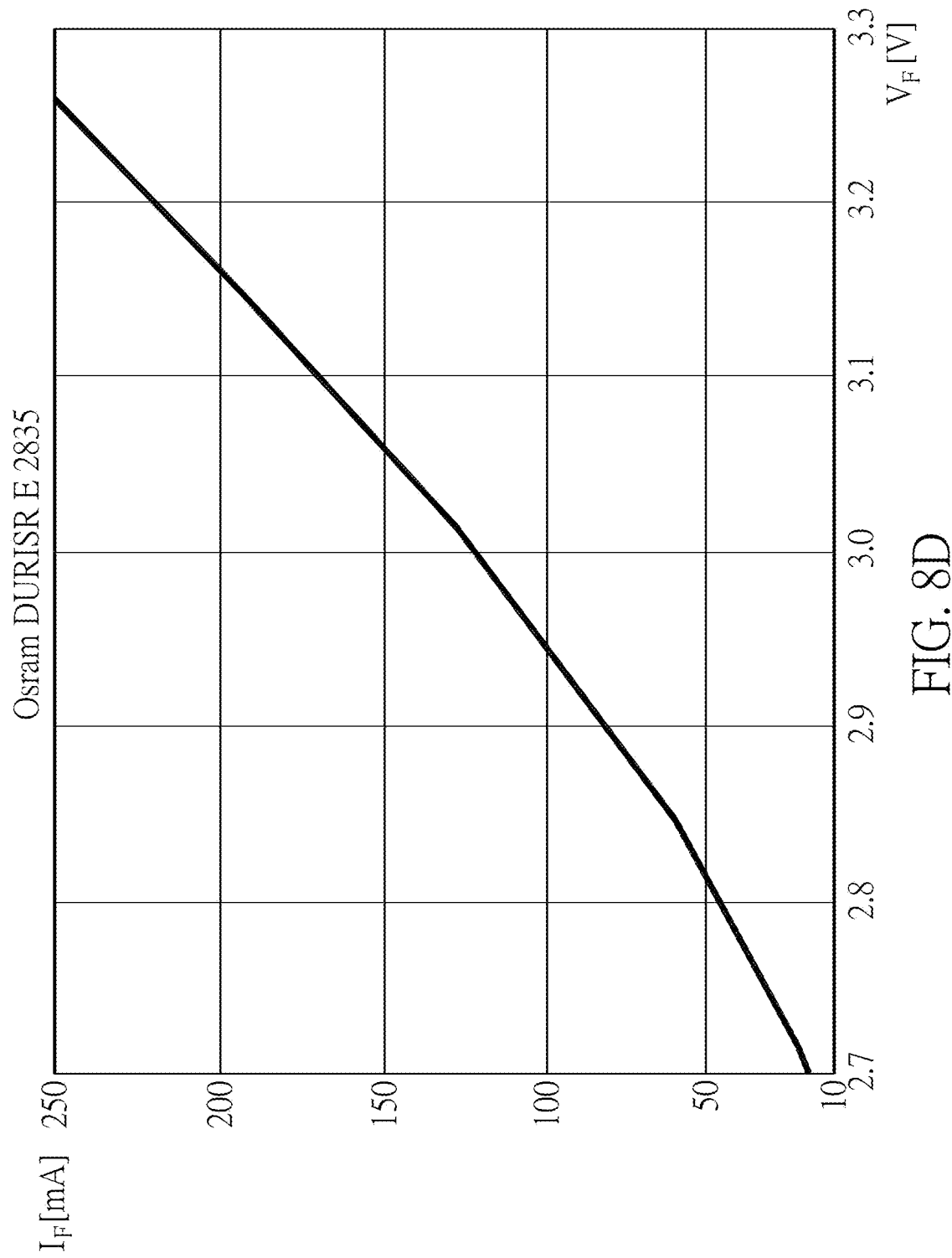

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

When the light source of the light-emitting unit 150 is confined to the use of an LED load, the compliance and satisfaction of an operating constraint attributable to the unique electrical characteristics of the LED load is vital to a successful performance of an LED lighting device. Any LED lighting device failing to comply with the operating constraint of the unique electrical characteristics is bound to become a trouble art. This is because the LED as a kind of solid state light source has completely different electrical characteristics for performing light emission compared with conventional light source such as incandescent bulbs or fluorescent bulbs. For instance, for a white light or blue light LED there exists a very narrow voltage domain ranging from a threshold voltage at 2.5 volts to a maximum working voltage at 3.3 volts, which allows to operate adequately and safely the LED; in other words, when a forward voltage imposed on the LED is lower than the threshold voltage, the LED is not conducted and therefore no light is emitted, when the forward voltage exceeds the maximum working voltage, the heat generated by a forward current could start damaging the construction of the LED. Therefore, the forward voltage imposed on the LED is required to operate between the threshold voltage and the maximum working voltage. In respect to the LED load of the light-emitting unit 150, the cut-in voltage $V_t$ of ACLEDs is technically also referred to as the threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is a threshold voltage $V_{th}$ required to trigger the LED to start emitting light and the third electrical characteristic is a maximum working voltage $V_m$, allowed to impose on the LED to avoid a thermal runaway to damage or burn out the semiconductor construction of the LED. The described cut-in voltage $V_t$ has the same meaning as the above mentioned threshold voltage $V_{th}$ which is a more general term to be used for describing the second electrical characteristic of a PN junction semiconductor structure. Also because the cut-in voltage $V_t$ is specifically tied to forming a formula to transform the threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term $V_m$ is related to the amplitude of the instant maximum voltage of an AC power source which has nothing to do with the third electrical characteristic $V_{max}$ of an LED load.

An LED chip is a small piece of semiconductor material with at least one LED manufactured inside the semiconductor material. A plurality of LEDs may be manufactured and packaged inside an LED chip for different levels of wattage specification to meet different illumination need. For each LED chip designed with a different level of wattage specification there always exists a narrow voltage domain $V_{th}<V<V_{max}$, wherein $V_{th}$ is the threshold voltage to enable the LED chip to start emitting light and $V_{max}$ is the maximum working voltage allowed to impose on the LED chip to protect the LED chip from being damaged or burned out by the heat generated by a higher working voltage exceeding $V_{max}$.

For an LED load configured with a plurality of the LED chips in any LED lighting device, regardless such LED load being configured with ACLED chips or DC LED chips, the working voltage of each single LED chip is required to operate in a domain between a threshold voltage $V_{th}$ and a maximum working voltage $V_{max}$ or $V_{th}<V<V_m$, and a working voltage $V_N$ of the LED load comprising N pieces of LED chips connected in series is therefore required to operate in a domain established by a minimum voltage expressed by $N \times V_{th}$ and a maximum voltage expressed by $N \times V_{ma}$ or $N \times V_{th}<V_N<N \times V_{max}$, wherein N is the number of the LED chips electrically connected in series. For any LED lighting device comprising an LED load it is required that the LED load in conjunction with an adequate level of power source is configured with a combination of in series and in parallel connections of LED chips such that the electric current passing through each LED chip of the LED load remains at an adequate level such that a voltage V across each LED chip complies with an operating constraint of $V_{th}<V<V_{max}$ featuring electrical characteristics of the LED chip or a voltage $V_N$ across the LED load configured with N number of LED chips connected in series complies with an operating constraint of $N \times V_{th}<V_N<N \times V_{max}$. Such narrow operating range therefore posts an engineering challenge for a circuit designer to successfully design an adequate level of power source and a reliable circuitry configured with an adequate combination of in series connection and in parallel connection of LED chips for operating a higher power LED security light.

FIGS. 8A, 8B, 8C and 8D comprises 4 drawings schematically and respectively showing a V-I relationship chart (Forward Current vs. Forward Voltage) for a white light LED chip from each of 4 different LED manufacturers; as can be seen from the chart when a forward voltage V is below a minimum forward voltage at around 2.5 volts, the LED chip is not conducted so the current I is zero, as the forward voltage exceeds 2.5 volts the LED chip is activated to generate a current flow to emit light, as the forward voltage continues to increase, the current I increases exponentially at a much faster pace, at a maximum forward voltage around 3.3 volts the current I becomes 250 mA which generates a heat that could start damaging the PN junction of the LED chip. The minimum forward voltage (the threshold voltage or cut-in voltage) and the maximum forward voltage are readily available in the specification sheets at each of LED manufacturers, such as Cree, Lumileds, Samsung, Osram, and etc. Different LED manufacturers may have slightly different figures due to manufacturing process but the deviations of differences are negligible. The constraints of minimum forward voltage and maximum forward voltage represent physical properties inherent in any solid state light source. They are necessary matter for configuring any LED lighting products to ensure a normal performance of an LED load.

FIG. 9 is a data sheet showing data of the minimum forward voltages and maximum forward voltages collected from various LED manufacturers. They are fundamental requirements for configuring any LED lighting control devices to ensure a successful performance of any LED lighting device.

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers.

The compliance of the operating constraint $V_{th}<V<V_{max}$ is a necessary matter for any LED lighting device though it is not an obvious matter as it requires complicated technologies to calculate and coordinate among an adequate level of power source, a control circuitry and a non-linear light-emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer (Light of America) for marketing deceptive LED lamps and making false claims with respect to the life time of their LED lamps and a huge amount of monetary relief was claimed with the Court in the complaint.

The present disclosure of a two-level LED security light provides a unique lifestyle lighting solution. The motivation of creating such lifestyle lighting solution has less to do with the energy saving aspect of the low level illumination mode because LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the lifestyle lighting solution of the present disclosure is featured with two innovations which meaningfully improve the exquisite tastes of living in the evening, the first innovation is the creation of an aesthetic scene for the outdoor living environment, wherein at dusk the LED security light is automatically turned on by the photo sensor to perform the low level illumination which is necessary for creating a soft and aesthetic night scene for the outdoor living area (such soft and aesthetic night view is not achievable by the high level illumination however), the second innovation is the creation of a navigation capacity similar to a light house effect for guiding people to safely move toward a destination in the outdoor living area without getting lost or encountering an accident. These two innovative functions coupled with the motion sensor to increase illumination when people enters into the short detection area makes the present invention a perfect lifestyle lighting solution for enjoying an exquisite taste of evening life.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An LED security light comprising:
   a light-emitting unit;
   a loading and power control unit;
   a light sensing control unit;
   a motion sensing unit;
   a power supply unit; and
   a time setting unit comprising a first timer and a second timer;
   an external control unit comprising at least a first external control device;
   wherein the light-emitting unit is configured with an LED load comprising a plurality of LEDs;
   wherein the loading and power control unit comprises a controller and a switching circuitry, wherein the switching circuitry comprises at least a semiconductor switching device;
   wherein the controller is electrically coupled with the switching circuitry, the light sensing control unit, the motion sensing unit, the time setting unit, and the external control unit; wherein the switching circuitry is electrically coupled with the power supply unit and the light-emitting unit, wherein the controller outputs different pulse width modulation (PWM) signals to control the switching circuitry for delivering different average electric currents to drive the light-emitting unit for generating different illuminations, wherein the controller outputs at least a first PWM signal and a second PWM signal respectively to control the switching circuitry such that the light-emitting unit respectively performs at least a first illumination mode with a first level illumination and at least a second illumination mode with a second level illumination according to signal(s) received from the light sensing control unit and the motion sensing unit;

wherein at dusk when an ambient light detected by the light sensing control unit is lower than a first predetermined value, the loading and power control unit operates to deliver an average electric current to the LED load to turn on the light-emitting unit to perform the first illumination mode with the first level illumination for a predetermined time duration set by the first timer;

wherein when a motion signal is detected by the motion sensing unit, the loading and power control unit operates to increase the average electric current delivered to the LED load of the light-emitting unit to perform the second illumination mode with the second level illumination for a preset time period set by the second timer before being switched back to the first illumination mode with the first level illumination;

wherein a light intensity of the first level illumination in the first illumination mode is adjustable; wherein the first external control device outputs a first external control signal to the controller, wherein the controller correspondingly outputs a different first PWM signal to control the semiconductor switching device for adjusting the light intensity of the first level illumination in the first illumination mode;

wherein a light intensity of the second level illumination is equal to or higher than the light intensity of the first level illumination;

wherein at dawn when the ambient light detected by the light sensing control unit is higher than a second predetermined value, the light-emitting unit is switched off by the loading and power control unit;

wherein the first timer and the second timer are respectively designed for adjusting and setting the predetermined time duration of the first level illumination and the preset time period of the second level illumination;

wherein the power supply unit is an AC/DC power converter to convert AC power into a DC power to be delivered to the switching circuitry, wherein the switching circuitry is designed with a driving circuitry to output an adequate DC voltage with an essentially constant current electric power to drive the LED load such that an electric current passing through each LED of the LED load remains at an adequate level, and a voltage V across each LED complies with an operating constraint of $V_{th}<V<V_{max}$ featuring LED electrical characteristics;

wherein $V_{th}$ is a threshold voltage required to trigger each LED to start emitting light and $V_{max}$ is a maximum voltage across each LED to avoid a thermal damage to the LED construction;

wherein when the LED load is configured with a plurality of N number LEDs or N sets of LEDs electrically connected in series, a working voltage $V_N$ across the LED load is confined in a domain between a minimum voltage equal to the sum of the threshold voltages of all LEDs or sets of LEDs electrically connected in series and a maximum voltage equal to the sum of the maximum operating voltages of all LEDs or sets of LEDs electrically connected in series, identically expressed as $N \times V_{th} < V_N < N \times V_{max}$.

2. The LED security light according to claim 1, wherein when the light intensity of the second level illumination in the second illumination mode is higher than the light intensity of the first level illumination in the first illumination mode, the LED security light serves as a motion sensing security light; wherein at dusk the light-emitting unit is turned on by the light sensing control unit to perform the first level illumination with a low level light intensity, wherein when a motion intrusion is detected by the motion sensing unit, the loading and power control unit operates to increase the electric power delivered to the light-emitting unit to perform the second level illumination with a high level light intensity for the preset time period before switching back to resume the second level illumination, at dawn the light-emitting unit is turned off by the loading and power control unit.

3. The LED security light according to claim 1, wherein when the light intensity of the first level illumination in the first illumination mode is adjusted to the same level of the light intensity of the second level illumination in the second illumination mode, the LED security light effectively serves as a dusk to dawn security light, wherein the light-emitting unit is turned on at dusk and turned off at dawn by the light sensing control unit.

4. The LED security light according to claim 1, wherein the first external control device comprises a voltage divider, wherein when the voltage divider is operated, a DC voltage is selected and generated by tuning a variable resistor to trigger the controller to activate a corresponding process designed for adjusting and setting the light intensity of the first level illumination in a first predesigned range.

5. The LED security light according to claim 4, wherein the first predesigned range is between 0% and 100% of a maximum light intensity designed for the LED security light.

6. The LED security light according to claim 1, wherein the external control unit further comprises a second external control device electrically connected to the controller, wherein a light intensity of the second illumination is adjustable in a second predesigned range, wherein the second external control device comprises a voltage divider, wherein when the voltage divider is operated, a DC voltage is selected and generated by turning a variable resistor to trigger the controller to activate a corresponding process designed for adjusting and setting the light intensity of the second level illumination in the second predesigned range.

7. The LED security light according to claim 6, wherein the second predesigned range is between 50% and 100% of a maximum light intensity designed for the LED security light.

8. The LED security light according to claim 1, wherein the first timer of the time setting unit is configured with a voltage divider for adjusting and setting a time length of the predetermined time duration of the first level illumination in the first illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the predetermined time duration of the first level illumination in the first illumination mode.

9. The LED security light according to claim 8, wherein the time length of the predetermined time duration of the first level illumination is ended at a time point when the ambient light detected by the light sensing control unit is higher than the second predetermined value and the light-emitting unit accordingly is switched off by the loading and power control unit, wherein the LED security light performs a dusk to dawn security light.

10. The LED security light according to claim 1, wherein the second timer of the time setting unit is configured with a voltage divider for adjusting and setting a time length of the preset time period of the second level illumination in the second illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the preset time period of the second level illumination in the second illumination mode.

11. The LED security light according to claim 1, wherein the first external control device is a wireless remote control device comprising a transceiver, wherein the wireless remote control device is capable of receiving an external control signal for adjusting at least an operating parameter of the LED security light, wherein when the controller receives the external control signal the controller operates to activate a process to accordingly adjust the operating parameter of the LED security light, wherein the wireless receiver is also capable of transmitting a wireless control signal according to the received external control signal to control the same operating parameter of a neighboring LED security light.

12. The LED security light according to claim 11, wherein the operating parameter is the light intensity of the first level illumination, the light intensity of the second level illumination, a time length of the preset time period, or a time length of the predetermined time duration.

13. An LED security light comprising:
a light-emitting unit;
a loading and power control unit;
a light sensing control unit;
a motion sensing unit;
a power supply unit; and
a time setting unit comprising a first timer and a second timer;
an external control unit comprising at least a first external control device;
wherein the light-emitting unit is configured with an LED load comprising a plurality of LEDs;
wherein the loading and power control unit comprises a controller and a switching circuitry, wherein the switching circuitry comprises at least a semiconductor switching device;
wherein the controller is electrically coupled with the switching circuitry, the light sensing control unit, the motion sensing unit, the time setting unit, and the external control unit; wherein the switching circuitry is electrically coupled with the power supply unit and the light-emitting unit, wherein the controller outputs different pulse width modulation (PWM) signals to respectively control the switching circuitry for delivering different average electric currents to drive the light-emitting unit for generating different illuminations, wherein the controller outputs at least a first PWM signal and a second PWM signal respectively to control the switching circuitry such that the light-emitting unit respectively performs at least a first illumination mode with a first level illumination and at least a second illumination mode with a second level illumination according to signal(s) received from the light sensing control unit and the motion sensing unit;
wherein at dusk when an ambient light detected by the light sensing control unit is lower than a first predetermined value, the loading and power control unit operates to deliver a first average electric current to the LED load to turn on the light-emitting unit to perform the first illumination mode with the first level illumination for a predetermined time duration set by the first timer with the motion sensing unit being deactivated;
wherein upon a maturity of the predetermined time duration the loading and power control unit manages to cutoff the first average electric current delivered to the LED load to turn off the light-emitting unit and at the same time the motion sensing unit is activated;
wherein when a motion signal is detected by the motion sensing unit, the loading and power control unit operates to deliver a second average electric current to the LED load of the light-emitting unit to perform the second illumination mode with the second level illumination for a preset time period set by the second timer before the light-emitting unit is switched back to a turned off state;
wherein a light intensity of the first level illumination in the first illumination mode is adjustable; wherein the first external control device outputs a first external control signal to the controller, wherein the controller correspondingly outputs a different first PWM signal to control the semiconductor switching device for adjusting the light intensity of the first level illumination in the first illumination mode;
wherein a light intensity of the second level illumination is equal to or higher than the light intensity of the first level illumination;
wherein at dawn when the ambient light detected by the light sensing control unit is higher than a second predetermined value, the light-emitting unit is switched off by the loading and power control unit;
wherein the first timer and the second timer are respectively used for adjusting and setting the predetermined time duration of the first level illumination and the preset time period of the second level illumination;
wherein the power supply unit is an AC/DC power converter to convert AC power into a DC power to be delivered to the switching circuitry, wherein the switching circuitry is designed with a driving circuitry to output an adequate DC voltage with an essentially constant current electric power to drive the LED load such that an electric current passing through each LED of the LED load remains at an adequate level, and a voltage V across each LED complies with an operating constraint of $V_{th}<V<V_{max}$ featuring LED electrical characteristics;
wherein $V_{th}$ is a threshold voltage required to trigger each LED to start emitting light and $V_{max}$ is a maximum voltage across each LED to avoid a thermal damage to the LED construction;
wherein when the LED load is configured with a plurality of N number LEDs or N sets of LEDs electrically connected in series, a working voltage $V_N$ across the LED load is confined in a domain between a minimum voltage equal to the sum of the threshold voltages of all LEDs or sets of LEDs electrically connected in series and a maximum voltage equal to the sum of the maximum operating voltages of all LEDs or sets of LEDs electrically connected in series, identically expressed as $N \times V_{th} < V_N < N \times V_{max}$.

14. The LED security light according to claim 13, wherein the first external control device comprises a voltage divider, wherein when the voltage divider is operated, a DC voltage is selected and generated by tuning a variable resistor to trigger the controller to activate a corresponding process designed for adjusting and setting a light intensity of the first level illumination in a first predesigned range.

15. The LED security light according to claim 14, wherein the first predesigned range is between 50% and 100% of a maximum light intensity designed for the LED security light.

16. The LED security light according to claim 13, wherein external control unit further comprises a second external control device electrically connected to the controller, wherein the second external control device comprises a voltage divider, wherein when the voltage divider is operated, a DC voltage is selected and generated by turning a variable resistor to trigger the controller to activate a corresponding process designed for adjusting and setting the light intensity of the second level illumination in a second predesigned range.

17. The LED security light according to claim 16, wherein the second predesigned range is between 50% and 100% of a maximum light intensity designed for the LED security light.

18. The LED security light according to claim 13, wherein the first timer of the time setting unit is configured with a voltage divider for adjusting and setting a time length of the predetermined time duration of the first level illumination in the first illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the predetermined time duration of the first level illumination in the first illumination mode.

19. The LED security light according to claim 18, wherein—the time length of the predetermined time duration of the first level illumination is ended at a time point when the ambient light detected by the light sensing control unit is higher than the second predetermined value and the light-emitting unit accordingly is switched off by the loading and power control unit, wherein the LED security light performs a dusk to dawn security light.

20. The LED security light according to claim 13, wherein the second timer of the time setting unit is configured with a voltage divider for adjusting and setting a time length of the preset time period of the second level illumination in the second illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the preset time period of the second level illumination in the second illumination mode.

21. An LED security light comprising:
a light-emitting unit;
a loading and power control unit;
a light sensing control unit;
a motion sensing unit;
a power supply unit;
a time setting unit comprising at least a first timer and at least a second timer; and
an external control unit comprising at least a first external control device and at least a second external control device;
wherein the light-emitting unit is configured with an LED load comprising a plurality of LEDs;

wherein the loading and power control unit comprises a controller and a switching circuitry, wherein the switching circuitry comprises at least a semiconductor switching device;
wherein the controller is electrically coupled with the switching circuitry, the light sensing control unit, the motion sensing unit, the time setting unit and the external control unit; wherein the switching circuitry is electrically coupled with the power supply unit and the light-emitting unit, wherein the controller outputs different pulse width modulation (PWM) signals to respectively control the switching circuitry for delivering different average electric currents to drive the LED load of the light-emitting unit for generating different illuminations, wherein the controller outputs at least a first PWM signal, at least a second PWM signal and at least a third PWM signal respectively to control the switching circuitry such that the light-emitting unit respectively performs at least a first illumination mode with a first level illumination, at least a second illumination mode with a second level illumination and at least a third illumination mode with a third level illumination;
wherein at dusk when an ambient light detected by the light sensing control unit is lower than a first predetermined value, the loading and power control unit operates to deliver an average electric current to the LED load to turn on the light-emitting unit to perform the first illumination mode with the first level illumination for a predetermined time duration set by the first timer with the motion sensing unit being deactivated;
wherein upon a maturity of the predetermined time duration the loading and power control unit manages to reduce the average electric current delivered to the LED load to enable the light-emitting unit to perform the second illumination mode with the second level illumination for a first preset time period and at the same time the motion sensing unit is activated;
wherein when a motion signal is detected by the motion sensing unit, the loading and power control unit operates to increase the average electric current to the LED load of the light-emitting unit to perform the third illumination mode with the third level illumination for a second preset time period set by the second timer before the light-emitting unit is switched back to perform the second illumination with the second level illumination;
wherein a light intensity of the first level illumination in the first illumination mode is adjustable; wherein the first external control device outputs a first external control signal to the controller, wherein the controller correspondingly outputs a different first PWM signal to control the semiconductor switching device for adjusting the light intensity of the first level illumination in the first illumination mode;
wherein a light intensity of the second level illumination in the second illumination mode is adjustable; wherein the second external control device outputs a second external control signal to the controller, wherein the controller correspondingly outputs a different second PWM signal to control the semiconductor switching device for adjusting the light intensity of the second level illumination in the second illumination mode;
wherein a light intensity of the third level illumination is higher than the light intensity of the second level illumination;

wherein at dawn when the ambient light detected by the light sensing control unit is higher than a second predetermined value, the light-emitting unit is switched off by the loading and power control unit;

wherein the first timer and the second timer are respectively used for adjusting and setting the predetermined time duration of the first level illumination and the second preset time period of the third level illumination;

wherein the power supply unit is an AC/DC power converter to convert AC power into a DC power to be delivered to the switching circuitry, wherein the switching circuitry is designed with a driving circuitry to output an adequate DC voltage with an essentially constant current electric power to drive the LED load such that an electric current passing through each LED of the LED load remains at an adequate level, and a voltage V across each LED complies with an operating constraint of $V_{th}<V<V_{max}$ featuring LED electrical characteristics;

wherein $V_{th}$ is a threshold voltage required to trigger each LED to start emitting light and $V_{max}$ is a maximum voltage across each LED to avoid a thermal damage to the LED construction;

wherein when the LED load is configured with a plurality of N number LEDs or N sets of LEDs electrically connected in series, a working voltage $V_N$ across the LED load is confined in a domain between a minimum voltage equal to the sum of the threshold voltages of all LEDs or sets of LEDs electrically connected in series and a maximum voltage equal to the sum of the maximum operating voltages of all LEDs or sets of LEDs electrically connected in series, identically expressed as $N \times V_{th} < V_N < N \times V_{max}$.

22. The LED security light according to claim 21, wherein the first external control device comprises a voltage divider, wherein when the voltage divider is operated, a DC voltage is selected and generated by turning a variable resistor to trigger the controller to activate a corresponding process designed for adjusting and setting the light intensity of the first level illumination in a first predesigned range.

23. The LED security light according to claim 22, wherein the first predesigned range is between 50% and 100% of a maximum light intensity designed for the LED security light.

24. The LED security light according to claim 21, wherein the second external control device comprises a voltage divider, wherein when the voltage divider is operated, a DC voltage is selected and generated by turning a variable resistor to trigger the controller to activate a corresponding process designed for adjusting and setting the light intensity of the second level illumination in a second predesigned range.

25. The LED security light according to claim 21, wherein the external control unit further comprises a third external control device electrically connected to the controller, wherein the light intensity of the third level illumination is adjustable, wherein the third external control device comprises a voltage divider, wherein when the voltage divider is operated, a DC voltage is selected and generated by turning a variable resistor to trigger the controller to activate a corresponding process designed for adjusting and setting the light intensity of the third level illumination in a third predesigned range.

26. The LED security light according to claim 25, wherein the third predesigned range is between 50% and 100% of a maximum light intensity designed for the LED security light.

27. The LED security light according to claim 21, wherein the first timer of the time setting unit is configured with a voltage divider for adjusting and setting a time length of the predetermined time duration of the first level illumination in the first illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the predetermined time duration of the first level illumination in the first illumination mode.

28. The LED security light according to claim 27, wherein the time length of the predetermined time duration of the first level illumination is ended at a time point when the ambient light detected by the light sensing control unit is higher than the second predetermined value and the light-emitting unit accordingly is switched off at dawn by the loading and power control unit, wherein the LED security light performs a dusk to dawn security light.

29. The LED security light according to claim 21, wherein the second timer of the time setting unit is configured with a voltage divider for adjusting and setting a time length of the second preset time period of the third level illumination in the third illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the second preset time period of the third level illumination in the third illumination mode.

30. The LED security light according to claim 21, wherein the time setting unit further comprises a third timer electrically connected with the controller, wherein a time length of the first preset time period is adjustable, wherein the third timer of the time setting unit is configured with a voltage divider for adjusting and setting a time length of the first preset time period of the second level illumination in the second illumination mode, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the first preset time period of the second level illumination in the second illumination mode.

31. An LED security light comprising:
a light-emitting unit;
a loading and power control unit;
a light sensing control unit;
a motion sensing unit;
a power supply unit;
a time setting unit comprising at least a first timer; and
an external control unit comprising at least a first external control device;
wherein the light-emitting unit is configured with an LED load comprising a plurality of LEDs;

wherein the loading and power control unit comprises a controller and a switching circuitry, wherein the switching circuitry comprises at least a semiconductor switching device;

wherein the controller is electrically coupled with the switching circuitry, the light sensing control unit, the motion sensing unit, the first timer and the first external control device; wherein the switching circuitry is electrically coupled with the power supply unit and the light-emitting unit, wherein the controller outputs at least one pulse width modulation (PWM) signal to control the switching circuitry for delivering at least one average electric current to drive the LED load of the light-emitting unit for generating an illumination according to signal(s) received from the light sensing control unit and the motion sensing unit;

wherein at dusk when an ambient light detected by the light sensing control unit is lower than a first predetermined value, the loading and power control unit operates to activate the motion sensing unit to be ready for detecting a motion intrusion;

wherein when a motion signal is detected by the motion sensing unit, the loading and power control unit operates to deliver an average electric current to the LED load of the light-emitting unit to perform a high level illumination for a preset time period set by the first timer before being switched back to a turned off state for detecting a next motion intrusion;

wherein a light intensity of the high level illumination is adjustable; wherein the first external control device outputs a first external control signal to the controller, wherein the controller correspondingly outputs a first PWM signal to control the semiconductor switching device for adjusting the light intensity of the high level illumination;

wherein at dawn when the ambient light detected by the light sensing control unit is higher than a second predetermined value, the light-emitting unit is switched off by the loading and power control unit;

wherein the power supply unit is an AC/DC power converter to convert AC power into a DC power delivered to the switching circuitry, wherein the switching circuitry is designed with a driving circuitry to output an adequate DC voltage with an essentially constant current electric power to drive the LED load such that an electric current passing through each LED of the LED load remains at an adequate level, and a voltage V across each LED complies with an operating constraint of $V_{th}<V<V_{max}$ featuring LED electrical characteristics;

wherein $V_{th}$ is a threshold voltage required to trigger each LED to start emitting light and $V_{max}$ is a maximum voltage across each LED to avoid a thermal damage to the LED construction;

wherein when the LED load is configured with a plurality of N number LEDs or N sets of LEDs electrically connected in series, a working voltage $V_N$ across the LED load is confined in a domain between a minimum voltage equal to the sum of the threshold voltages of all LEDs or sets of LEDs electrically connected in series and a maximum voltage equal to the sum of the maximum operating voltages of all LEDs or sets of LEDs electrically connected in series, identically expressed as $N \times V_{th} < V_N < N \times V_{max}$.

32. The LED security light according to claim 31, wherein the first external control device comprises a voltage divider, wherein when the voltage divider is operated, a DC voltage is selected and generated by tuning a variable resistor to trigger the controller to activate a corresponding process designed for adjusting and setting the light intensity of the high level illumination in a predesigned range.

33. The LED security light according to claim 32, wherein the predesigned range is between 50% and 100% of a maximum light intensity designed for the LED.

34. The LED security light according to claim 31, wherein the first timer of the time setting unit is configured with a voltage divider for adjusting and setting a time length of the preset time period of the high level illumination, wherein the voltage divider comprises a variable resistor, wherein the voltage divider is electrically coupled to the controller, wherein when the voltage divider is operated, a DC voltage value is selected and generated by tuning the variable resistor to trigger the controller to activate a corresponding process designed for adjusting and setting the time length of the preset time period of the high level illumination.

35. The LED security light according to claim 31, wherein the first external control device is a wireless remote control device comprising a transceiver, wherein the wireless remote control device is capable of receiving an external control signal for adjusting at least an operating parameter of the LED security light, wherein when the controller receives the external control signal, the controller operates to activate a process to accordingly adjust the operating parameter of the LED security light, wherein the wireless receiver is also capable of transmitting a wireless control signal according to the received external control signal to control the same operating parameter of a neighboring LED security light.

36. The LED security light according to claim 35, wherein the operating parameter is the light intensity of the high level illumination or a time length of the preset time period.

* * * * *

UNITED STATES PATENT AND TRADEMARK OFFICE
CERTIFICATE OF CORRECTION

PATENT NO. : 11,183,039 B2  
APPLICATION NO. : 17/202879  
DATED : November 23, 2021  
INVENTOR(S) : Chen Page 1 of 1

It is certified that error appears in the above-identified patent and that said Letters Patent is hereby corrected as shown below:

In the Claims

1. Column 16, Line 10:  
Please delete the term "second" and insert --first--.

2. Column 16, Line 35:  
Please insert --level-- between the term "second" and the term "illumination".

3. Column 20, Line 47:  
Please insert --mode-- between the term "illumination" and the term "with".

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*